(12) United States Patent
Motoi

(10) Patent No.: US 9,390,341 B2
(45) Date of Patent: Jul. 12, 2016

(54) ELECTRONIC DEVICE AND METHOD FOR MANUFACTURING THE SAME

(71) Applicant: Kabushiki Kaisha Toshiba, Minato-ku, Tokyo (JP)

(72) Inventor: Shigeru Motoi, Kokubunji Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/497,190

(22) Filed: Sep. 25, 2014

(65) Prior Publication Data

US 2015/0269432 A1    Sep. 24, 2015

(30) Foreign Application Priority Data

Mar. 18, 2014    (JP) ................................ 2014-055578

(51) Int. Cl.
*G06K 9/00* (2006.01)
*G06K 9/22* (2006.01)

(52) U.S. Cl.
CPC ............ *G06K 9/222* (2013.01); *G06K 9/00402* (2013.01)

(58) Field of Classification Search
None
See application file for complete search history.

(56) References Cited

U.S. PATENT DOCUMENTS

| | | | |
|---|---|---|---|
| 6,256,410 B1 * | 7/2001 | Nathan et al. ................. | 382/187 |
| 6,317,762 B1 | 11/2001 | Okawa et al. | |
| 7,561,740 B2 * | 7/2009 | Denoue et al. ................ | 382/187 |
| 2003/0193478 A1 * | 10/2003 | Ng et al. ....................... | 345/168 |
| 2005/0017954 A1 * | 1/2005 | Kay et al. ..................... | 345/169 |
| 2005/0222848 A1 * | 10/2005 | Napper et al. .................... | 705/1 |
| 2006/0217953 A1 * | 9/2006 | Parikh ............................. | 704/1 |
| 2007/0079239 A1 * | 4/2007 | Ghassabian ................... | 715/707 |
| 2009/0297028 A1 * | 12/2009 | De Haan ....................... | 382/187 |
| 2010/0122164 A1 * | 5/2010 | Kay et al. ..................... | 715/708 |
| 2011/0184736 A1 * | 7/2011 | Slotznick ...................... | 704/249 |
| 2013/0024185 A1 * | 1/2013 | Parikh ............................. | 704/9 |
| 2014/0160032 A1 * | 6/2014 | Che et al. ...................... | 345/173 |
| 2015/0043824 A1 * | 2/2015 | Akhavan Fomani et al. . | 382/188 |

FOREIGN PATENT DOCUMENTS

| | | | |
|---|---|---|---|
| JP | 2004-192431 A | 7/2004 | |
| JP | 2007-265171 A | 10/2007 | |
| JP | 2008-021319 A | 1/2008 | |

\* cited by examiner

*Primary Examiner* — Aaron W Carter
(74) *Attorney, Agent, or Firm* — Knobbe, Martens, Olson & Bear LLP

(57) ABSTRACT

According to one embodiment, an electronic device includes processing circuitry. The processing circuitry displays one or more first strokes input by handwriting on a screen, and executes, in response to input of the one or more first strokes, processing for displaying a second stroke group selected from stroke groups which are input candidates searched by using the one or more first strokes on the screen, the stroke groups including the second stroke group and another stroke group, the second stroke group and the another stroke group corresponding to a first character string. A value in any one of a size, a number of coordinates for displaying, and a length of time for inputting, of to the second stroke group is bigger than that of the another stroke group.

5 Claims, 15 Drawing Sheets

| Character string | Amount of characteristics | Stroke data | ... |
|---|---|---|---|
| apple | 123456,1235··· | (10,10)-(13,8)-··· | ... |
| approve | ... | ... | ... |
| application | ... | ... | ... |
| aps | ... | ... | ... |
| ... | ... | ... | ... |

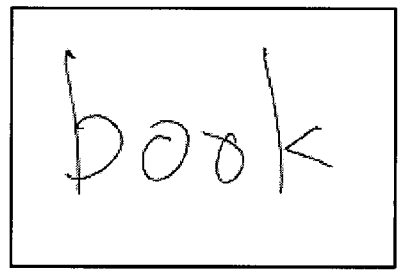
F I G. 12

ELECTRONIC DEVICE AND METHOD FOR MANUFACTURING THE SAME

CROSS-REFERENCE TO RELATED APPLICATIONS

This application is based upon and claims the benefit of priority from Japanese Patent Application No. 2014-055578, filed Mar. 18, 2014, the entire contents of which are incorporated herein by reference.

FIELD

Embodiments described herein relate generally to a technique of processing handwritten document data.

BACKGROUND

Recently, various electronic devices such as tablet computers, PDAs and smartphones have been developed. Most of these electronic devices comprise a touchscreen display for facilitating an input operation by the user, and some of them further comprise a handwriting function. Therefore, the user can create with these electronic devices a document including not only text and images but also handwritten characters and figures.

Here, there is a method of assisting the user to enter a character string such as a word by using a history of a character string which has been input by the user when the user inputs. For example, the size of a character string input by the assistance may be adjusted and displayed on the basis of the size of a handwritten character string which has been input immediately before. There are cases where a character string as adjusted in size to be displayed becomes distorted.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 12 illustrates an exemplary registered handwritten character string.

DETAILED DESCRIPTION

Various embodiments will be described hereinafter with reference to the accompanying drawings.

In general, according to one embodiment, an electronic device includes processing circuitry. The processing circuitry displays one or more first strokes input by handwriting on a screen, and executes, in response to input of the one or more first strokes, processing for displaying a second stroke group selected from stroke groups which are input candidates searched by using the one or more first strokes on the screen, the stroke groups including the second stroke group and another stroke group, the second stroke group and the another stroke group corresponding to a first character string. A value in any one of a size, a number of coordinates for displaying, and a length of time for inputting, of to the second stroke group is bigger than that of the another stroke group.

Figure 1:
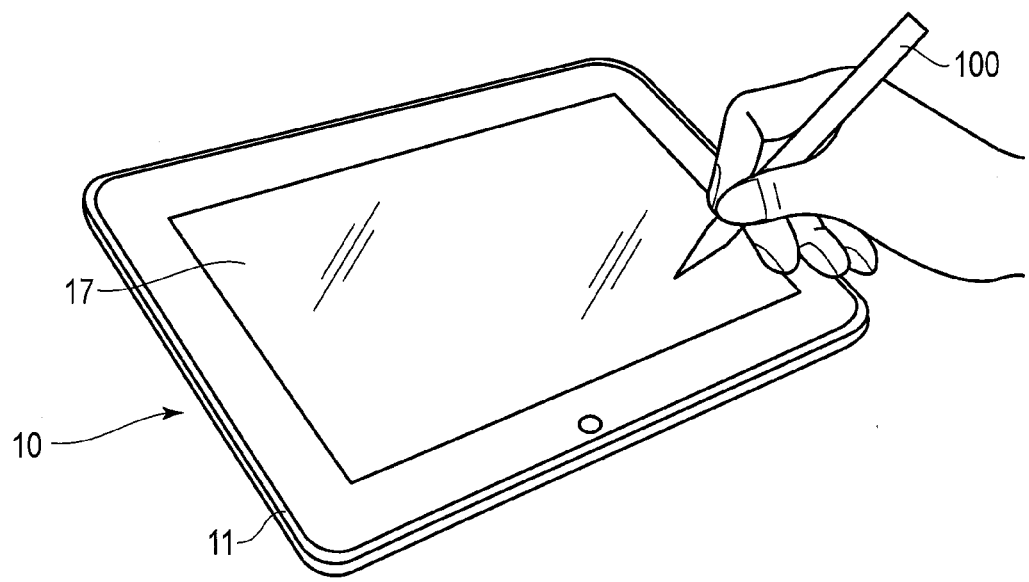
FIG. 1 is an exemplary perspective view of an external appearance of an electronic device of an embodiment.

FIG. 1 is a perspective view of an external appearance of an electronic device according to one embodiment. The electronic device is, for example, a stylus-based portable electronic device capable of handwriting input with a stylus or a finger. The electronic device can be realized as a tablet computer, a notebook computer, a smartphone, a PDA or the like. The following descriptions are presented given that the electronic device is realized as a tablet computer 10. The tablet computer 10 is a portable electronic device called a tablet or a slate computer. The tablet computer 10 comprises, as shown in FIG. 1, a body 11 and a touchscreen display 17. The body 11 comprises a thin box-shaped housing. The touchscreen display 17 is mounted on the upper surface of the body 11 in such a manner as to be overlaid thereon.

Into the touchscreen display 17, a flat panel display and a sensor are incorporated. The sensor is configured to detect the contact position of a stylus or a finger on the screen of the flat panel display. The flat panel display may be, for example, a liquid crystal display (LCD) device. As the sensor, for example, a capacitive touchpanel, an electromagnetic induction digitizer or the like may be used. The following descriptions are presented given that both of these two kinds of sensors, namely, a digitizer and a touchpanel are incorporated into the touchscreen display 17.

A digitizer is provided, for example, below the screen of the flat panel display. The touchpanel is provided, for example, on the screen of the flat panel display. The touchscreen display 17 can detect not only a touch operation with a finger with respect to the screen but also a touch operation with a stylus 100 with respect to the screen. The stylus 100 may be, for example, a digitizer stylus (electromagnetic induction stylus). The user can perform a handwriting input operation on the touchscreen display 17 with an external object (stylus 100 or a finger). During the handwriting input operation, a movement locus of an external object (stylus 100 or a finger) on the screen, that is, a locus of a stroke input by handwriting is rendered in real time. In this way, the locus of each stroke is displayed on the screen. A locus of the movement of an external object while in contact with the screen corresponds to one stroke. A collection of numbers of strokes corresponding to a handwritten character, figure or the like, that is, a collection of numbers of loci (handwriting) constitutes a handwritten document.

In the present embodiment, this handwritten document is stored in a storage medium not as image data but as time-series data indicative of a coordinate sequence of a locus of each stroke and an order relationship between strokes. The time-series data, which will be described later in detail with reference to FIG. 3, indicates the order in which a plurality of strokes are handwritten and includes a plurality of items of stroke data corresponding to the plurality of respective strokes. In other words, the time-series data represents a collection of items of time-series stroke data corresponding to a plurality of respective strokes. Each item of stroke data corresponds to one stroke and includes a series of items of coordinate data (time-series coordinates) corresponding to respective points on the locus of the stroke. These items of stroke data are arranged in the order in which the strokes are handwritten, namely, in the stroke order.

The tablet computer 10 can retrieve any time-series data (handwritten document data) which has already been stored in a storage medium to display on the screen a handwritten document corresponding to the time-series data, that is, loci corresponding to a plurality of respective strokes indicated by the time-series data. Further, the tablet computer 10 comprises an editing function. The editing function makes it possible to delete or displace any stroke, handwritten character and the like in a handwritten document currently being displayed on the basis of an editing operation by the user with an "eraser" tool, a "range specification" tool, various other tools, or the like. Further, the editing function includes a function of deleting a history of several handwriting operations.

Further, the tablet computer 10 comprises a handwriting assist (stroke recommendation) function. The handwriting assist function is a function to assist the user in a handwriting input operation so that the user can easily input numbers of character strings by handwriting.

Next, with reference to FIGS. 2 and 3, the relationship between a stroke (character, mark, figure [diagram], chart, etc.) handwritten by the user and a handwritten document will be described. FIG. 3 illustrates an example of a handwritten character string handwritten on the touchscreen display with the stylus 100 or the like.

In handwritten documents, there are many cases where, on a handwritten character, figure, etc., another character, figure, etc., is further handwritten. In FIG. 2, a case where a handwritten character string "ABC" is handwritten in the order of A, B and C, and a handwritten arrow is then handwritten in immediate proximity to the handwritten character "A" is described.

The handwritten character "A" is represented by two strokes handwritten with the stylus 100 or the like (a locus in the shape of "Λ" and a locus in the shape of "-"), that is, by two loci. The locus in the shape of "Λ" handwritten first with the stylus 100 is, for example, sampled at equal time intervals in real time, and thus time-series coordinates of the "Λ" shaped stroke SD11, SD12, . . . , SD1n are obtained. Similarly, the locus in the shape of the "-" shape handwritten with the stylus 100 next is sampled at equal time intervals in real time, and thus time-series coordinates of the "-" shaped stroke, SD21, SD22, . . . , SD2n are obtained.

The handwritten character "B" is represented by two strokes handwritten with the stylus 100 or the like, that is, by two loci. The handwritten character "C" is represented by one stroke handwritten with the stylus 100 or the like, that is, by one locus. The handwritten "arrow" is represented by two handwritten strokes handwritten with the stylus 100 or the like, that is, by two loci.

Figure 2:
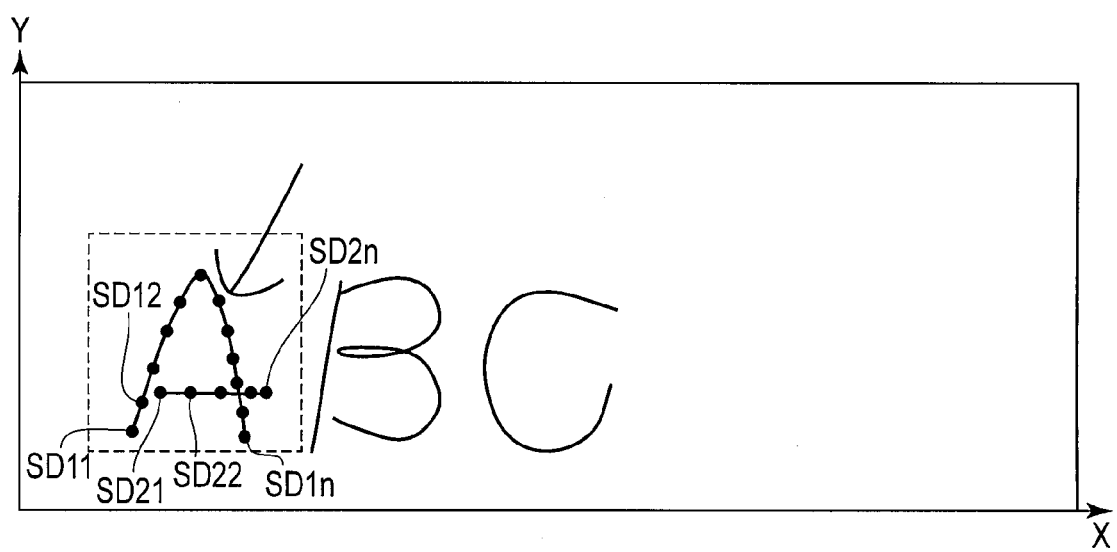
FIG. 2 illustrates an exemplary handwritten document handwritten on a touchscreen display of the electronic device of FIG. 1.
Figure 3:
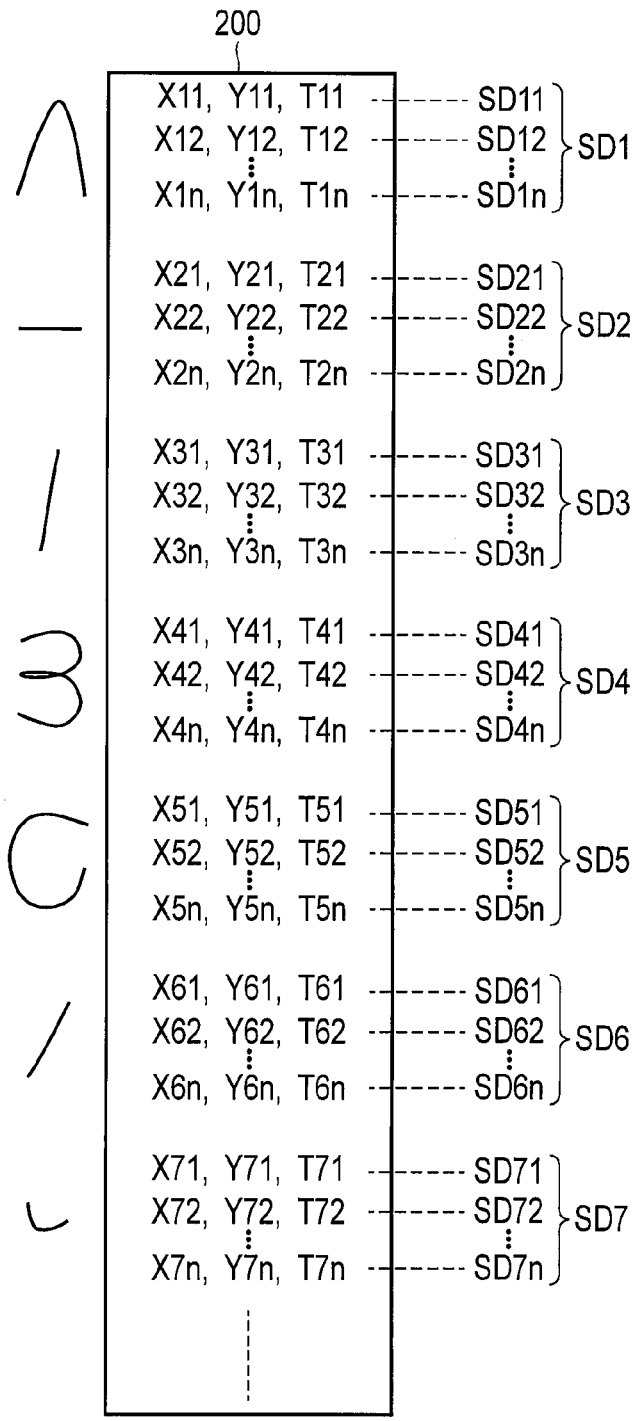
FIG. 3 is an exemplary view for explaining time-series data corresponding to the handwritten document of FIG. 2, generated by the electronic device of FIG. 1.

FIG. 3 illustrates time-series data 200 corresponding to the handwritten character strings of FIG. 2. The time-series data 200 includes a plurality of items of stroke data SD1, SD2, . . . , SD7. In the time-series data 200, these items of stroke data SD1, SD2, . . . , SD7 are listed in the stroke order, that is, in the order in which the plurality of strokes are handwritten, namely, in chronological order.

In the time-series data 200, the first two items of stroke data SD1 and SD2 indicate two strokes of the handwritten character "A", respectively. The third and fourth items of stroke data SD3 and SD4 indicate two strokes constituting the handwritten character "B", respectively. The fifth item of stroke data SD5 indicates one stroke constituting the handwritten character "C". The sixth and seventh items of stroke data SD6 and SD7 indicate two strokes constituting the handwritten "arrow", respectively.

Each item of stroke data includes a series of items of coordinate data (time-series coordinates) corresponding to one stroke, that is, a plurality of coordinates corresponding to a plurality of respective points on a locus of one stroke. In each item of stroke data, a plurality of coordinates are listed in the order in which a stroke is handwritten, namely, in chronological order. For example, for the handwritten character "A", the item of stroke data SD1 includes a series of items of coordinate data (time-series coordinates) corresponding to respective points on the locus of the "Λ" shaped stroke, namely, n coordinate data SD11, SD12, . . . , SD1n. The item of stroke data SD2 includes a series of items of coordinate data corresponding to respective points on the locus of the "-" shaped stroke, namely, n coordinate data SD21, SD22, . . . , SD2n. That is, the locus of the stylus 100 is sampled at equal time intervals in real time, and therefore the number of coordinate data increases as a stroke becomes longer or a stroke is handwritten more slowly.

Each item of coordinate data indicates an x-coordinate and a y-coordinate corresponding to a certain point on a corresponding locus. For example, the coordinate data SD11 indicates the x-coordinate (X11) and y-coordinate (Y11) of the starting point of the "Λ" shaped stroke. SD1n indicates the x-coordinate (X1n) and y-coordinate (Y1n) of the end point of the "Λ" shaped stroke.

Further, each item of coordinate data may include timestamp data T corresponding to a point of time when a point corresponding to the coordinates is handwritten. The handwritten time point may be an absolute time (such as year, month, date, hour, minute and second) or a relative time set with respect to a certain point of time. For example, an absolute time (such as year, month, date, hour, minute and second) may be added to each item of stroke data as timestamp data, and further to each item of coordinate data in the stroke data, a relative time indicative of a difference from the absolute time may be added as timestamp data.

In this way, by using time-series data including coordinate data each having timestamp data T added thereto, a time relationship between strokes can be described more accurately.

Further, data indicative of writing pressure (Z) may be added to each item of coordinate data.

The time-series data 200 with a structure shown in FIG. 3 can indicate not only the handwriting of individual stroke but also the time relationship between the strokes. Consequently, with the time-series data 200, even when the fore-end of the handwritten "arrow" is written over or in proximity to the handwritten character "A" as shown in FIG. 2, the hand written character "A" and the fore-end portion of the handwritten "arrow" can be treated as different characters or figures from each other. Note that the timestamp data T may be used as optional data and a plurality of items of stroke data having no timestamp data T may also be used as the time-series data described above.

Further, in the present embodiment, as described above, a handwritten document is stored not as a recognition result of an image or a character but as a collection of items of time-series stroke data. Therefore, a handwritten character can be treated regardless of the language of the handwritten character. Therefore, the structure of the time-series data 200 of the present embodiment can be commonly used in various countries around the world in which difference languages are used.

Figure 4:
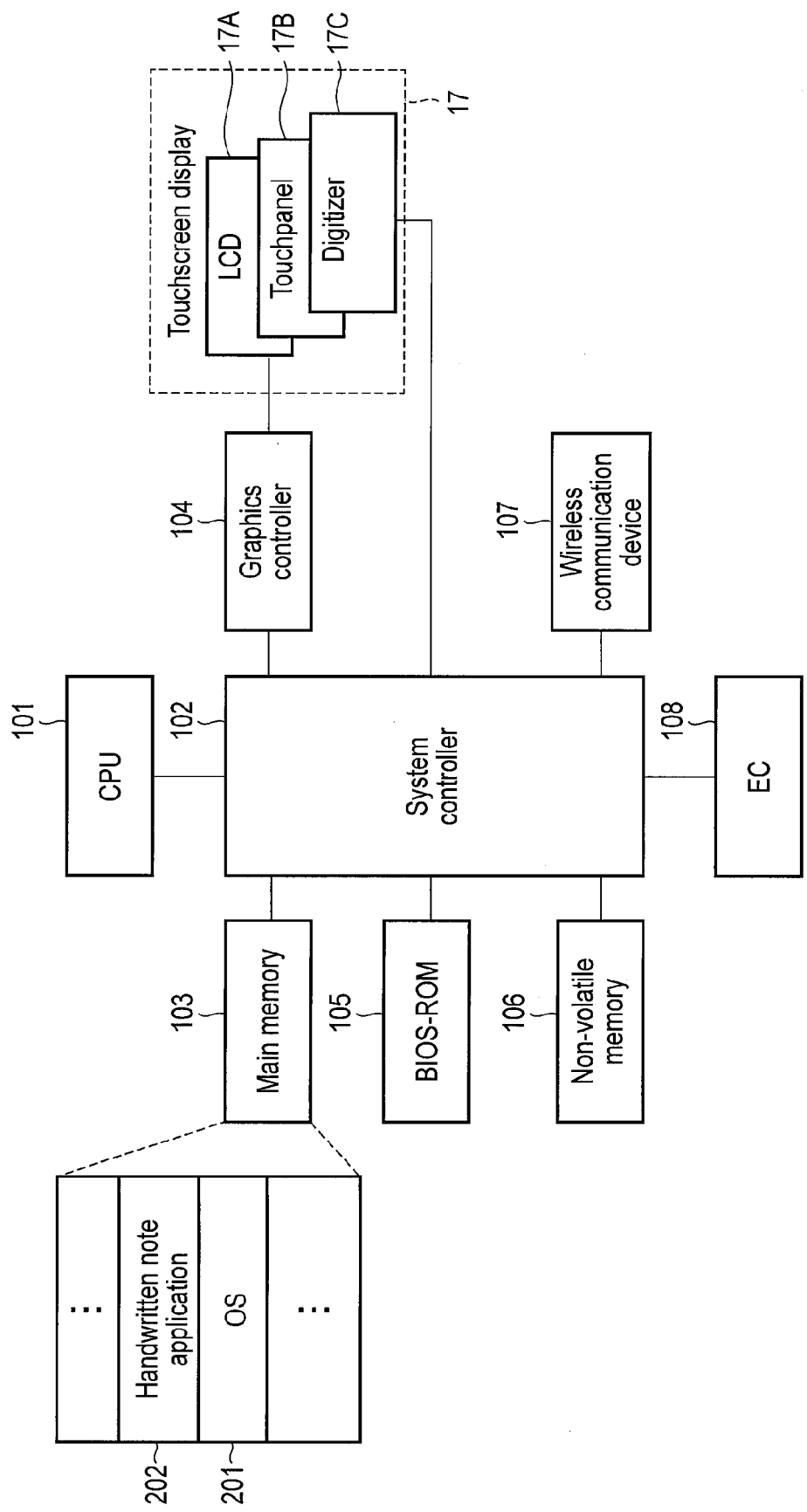
FIG. 4 is an exemplary block diagram showing a system configuration of the electronic device of FIG. 1.

FIG. 4 illustrates a system configuration of the tablet computer 10.

The tablet computer 10 comprises, as shown in FIG. 4, a central processing unit (CPU) 101, a system controller 102, a main memory 103, a graphics controller 104, a BIOS-ROM 105, a non-volatile memory 106, a wireless communication device 107, an embedded controller (EC) 108, and the like.

The CPU 101 is a processor configured to control operations of various modules in the tablet computer 10. The CPU 101 executes various computer programs loaded from a storage device, namely, the non-volatile memory 106 into the main memory 103. These programs include an operating system (OS) 201 and various application programs. The various application programs include a handwritten note application program 202. The handwritten note application program 202 comprises a function of creating and displaying the handwritten document described above, a function of editing the handwritten document, a handwriting assist function, and the like.

The CPU 101 further executes a basic input/output system (BIOS) stored in the BIOS-ROM 105. The BIOS is a program for hardware control.

The system controller 102 is a device configured to connect a local bus of the CPU 101 and various other components. The system controller 102 incorporates a memory controller configured to perform access control of the main memory 103. Further, the system controller 102 comprises a function of performing communication with the graphics controller 104 via a serial bus conforming to the PCI Express standard or the like.

The graphics controller 104 is a display controller configured to control an LCD 17A used as a display monitor of the tablet computer 10. A display signal generated by the graphics controller 104 is transmitted to the LCD 17A. The LCD 17A displays a screen image based on the display signal. The LCD 17A is provided with a touchpanel 17B and a digitizer 17C thereon. The touchpanel 17B is a capacitive pointing device for performing input on the screen of the LCD 17A. A contact position contacted with a finger on the screen, the movement of the contact position, and the like are detected by the touchpanel 17B. The digitizer 17C is an electromagnetic induction pointing device configured to perform input on the screen of the LCD 17A. A contact position contacted with the stylus 100 on the screen, the movement of the contact position, and the like are detected by the digitizer 17C.

The wireless communication device 107 is a device configured to establish a wireless communication such as a wireless local area network (LAN) or 3G mobile communication. The EC 108 is a single-chip microcomputer including an embedded controller for power control. The EC 108 comprises a function of powering on or powering off the tablet computer 10 based on an operation of a power button by the user.

Figure 5:
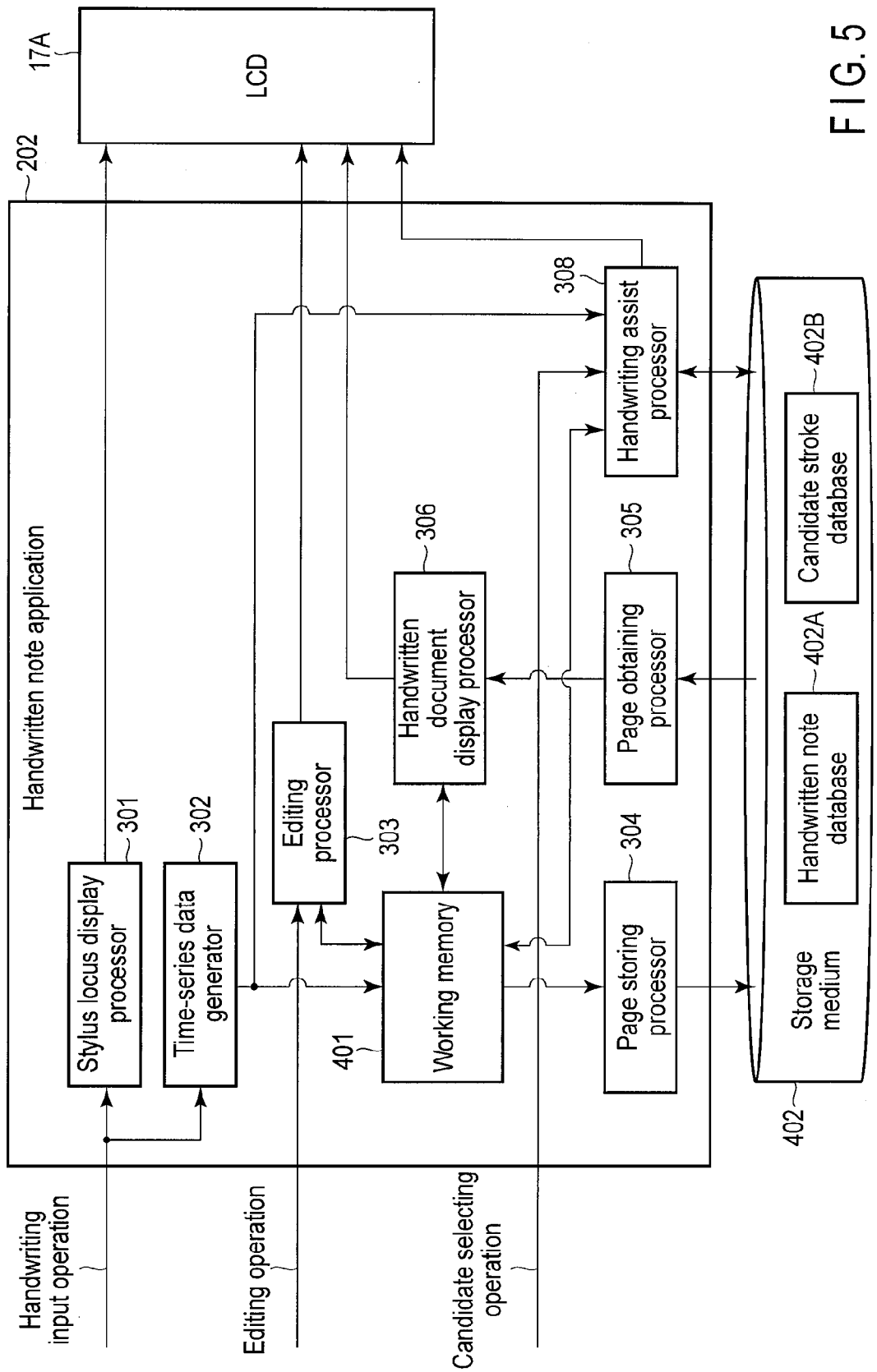
FIG. 5 is an exemplary block diagram showing a function configuration of a handwritten note application program executed by the electronic device of FIG. 1.

Next, with reference to FIG. 5, the function configuration of the handwritten note application program 202 will be described.

The handwritten note application program 202 comprises a stylus locus display processor 301, a time-series data generator 302, an editing processor 303, a page storing processor 304, a page obtaining processor 305, a handwritten document display processor 306, a handwriting assist processor 308 and the like.

The handwritten note application program 202 perform creation, display, editing, etc., of a handwritten document (handwritten data) by using stroke data input by the touchscreen display 17. The touchscreen display 17 is configured to detect an occurrence of an event such as "touch", "move (slide)", "release" or the like. The "touch" is an event indicating that an external object is brought into contact with the screen. The "move (slide)" is an event indicating that an external object is moved while in contact with the screen. The "release" is an event indicating that an external object is released from the screen.

The stylus locus display processor 301 and time-series data generator 302 receive either one event of "touch" and "move (slide)" generated by the touchscreen display 17, thereby detecting a handwriting input operation. The "touch" event includes the coordinates of a contact position. The "move (slide)" event includes the coordinates of the place to which a contact position is shifted. Therefore, the stylus locus display processing 301 and time-series data generator 302 can receive a coordinate sequence corresponding to the movement locus of a contact position.

The stylus locus display processor 301 functions as a display processor configured to display a stroke input by handwriting on the screen of the touchscreen display 17. The stylus locus display processor 301 receives a coordinate sequence from the touchscreen display 17. Then, based on the series of coordinates, the stylus locus display processor 301 displays a plurality of strokes input by the handwriting input operation with the stylus 100 or the like on the screen of the LCD 17A in the touchscreen display 17.

The time-series data generator 302 receives the above-mentioned coordinate sequence output from the touchscreen display 17. Based on the coordinate sequence, the time-series data generator 302 generates a plurality of items of stroke data (time-series data) corresponding to the above-mentioned plurality of strokes. These items of stroke data, namely, the coordinates corresponding to respective points of respective strokes and the timestamp data of respective strokes may be stored temporarily in a working memory 401.

The page storing processor 304 stores handwritten document data including a plurality of items of stroke data corresponding to a plurality of strokes, in a handwritten note database 402A inside a storage medium 402. The storage medium 402 may be, as described above, any one of a storage device in the tablet computer 10, a storage device in the personal computer 1 and a storage device in the server 2.

The page obtaining processor 305 retrieves any handwritten document data from the storage medium 402. The retrieved handwritten document data is transmitted to the handwritten document display processor 306. The handwritten document display processor 306 analyzes the handwritten document data and displays, based on the result of the analysis, loci of a plurality of strokes indicated by a plurality of items of stroke data in the handwritten document data as a handwritten page on the screen.

The editing processor 303 executes processing for editing a handwritten document (handwritten page) currently being displayed. That is, the editing processor 303 executes, based on an editing operation performed by the user on the touchscreen display 17, editing processing to delete, move, or the like one or more strokes of a plurality of strokes being displayed. Further, the editing processor 303 renews the handwritten document to reflect the result of the editing processing in the displayed handwritten document.

The user can delete any stroke of a plurality of strokes being displayed by using an "eraser" tool or the like. Further, the user can select any portion of the displayed handwritten page by using a "range specification" tool to circle or box any portion on the screen.

The handwriting assist processor 308 is a processor configured to execute the above-mentioned handwriting assist function. In the handwriting assist processing, the handwriting assist processor 308 obtains one or more groups of strokes (one or more first strokes) corresponding to a stroke input by handwriting from a collection of strokes (handwritten document data) input in the past. The handwriting assist processor 308 then executes processing for displaying the obtained one or more groups of strokes as stroke candidates (candidate strokes) (second stroke groups) which can be input on the screen.

In other words, the handwriting assist processor 308 predicts, based on the input stroke and the handwritten document data, a group of strokes (handwritten character string) which the user intends to handwrite. Then, the handwritten assist processor 308 presents the user several groups of strokes (handwritten character strings) obtained by the prediction as candidate strokes (candidate handwritten character strings).

For example, when a stroke (handwritten character string) "a" is input by handwriting, candidates such as handwritten words "add" or "access" may be presented to the user. If the user selects the handwritten word "access", the handwritten word "access" becomes an input handwritten character string. Therefore, the user can input the group of strokes of the handwritten word "access" easily.

The handwritten character string stored in the handwritten document data may be in any languages. Examples of the languages which can be used include English, Japanese, Chinese and various other languages. An English letter string (handwritten letter string) may be a group of strokes corresponding to a block letter string or a group of strokes corresponding to a cursive letter string. There is a case where a word handwritten in cursive consists of a single stroke. Therefore, a group of strokes obtained from the handwritten document data by the handwriting assist processing may not necessarily include a plurality of strokes but may be a single stroke.

Examples of a group of strokes corresponding to an input stroke are a plurality of strokes containing a stroke similar to the input stroke and a single stroke containing a stroke portion similar to the input stroke. For example, a group of strokes in which the first stroke (or the beginning of a stroke) similar to the input stroke is obtained from the handwritten document data.

In order to readily obtain a group of strokes corresponding to the input stroke from the handwritten document data, the handwriting assist processor 308 may generate a candidate stroke database 402B comprising a plurality of stroke groups based on a stroke collection (handwritten document data) stored in the handwritten note database 402A.

In the candidate stroke database 402B, for example, a group of strokes (group of items of stroke data) and a result of character recognition (character string) corresponding to the group of strokes may be stored in units of character strings having meanings such as words.

In this case, the handwriting assist processor 308 may first perform character recognition of a stroke input by the user. Subsequently, the handwriting assist processor 308 refers to the candidate stroke database 402B and retrieves a character string the front portion of which coincides with the result of the character recognition of the input stroke. The handwriting assist processor 308 obtains a group of strokes (group of items of stroke data) corresponding to the retrieved character string from the candidate stroke database 402B as a group of strokes corresponding to the input stroke.

Alternatively, in the candidate stroke database 402B, for example, a group of strokes (group of items of stroke data) and an amount of characteristics of each stroke corresponding to the stroke data group may be stored in units of character strings having meanings such as words. As an amount of characteristics of a stroke, any characteristics which can indicate handwriting characteristics of the stroke may be used. For example, data of an amount of characteristics indicative of a stroke shape, a stroke handwritten direction, a stroke inclination, etc., may be used as an amount of characteristics. In this case, the handwriting assist processor 308 may obtain a group of strokes comprising an amount of characteristics similar to that of the input stroke from the candidate stroke database 402B.

Alternatively, in the candidate stroke database 402B, for example, a group of strokes (group of items of stroke data), a result of character recognition (character string) corresponding to the group of items of stroke data, and an amount of characteristics of each stroke corresponding to the stroke data group may be stored.

The handwriting assist processor 308 predicts, based on an input stroke and the candidate stroke database 402B, a group of strokes which the user intends to input. In the prediction processing, the handwriting assist processor 308 obtains several groups of strokes (handwritten character strings, etc.) corresponding to the input stroke from the candidate stroke database 402B. The handwriting assist processor 308 then executes processing for displaying these groups of strokes on the screen as handwritten character string candidates predicted to be input (candidate strokes).

Figures 6, 7:
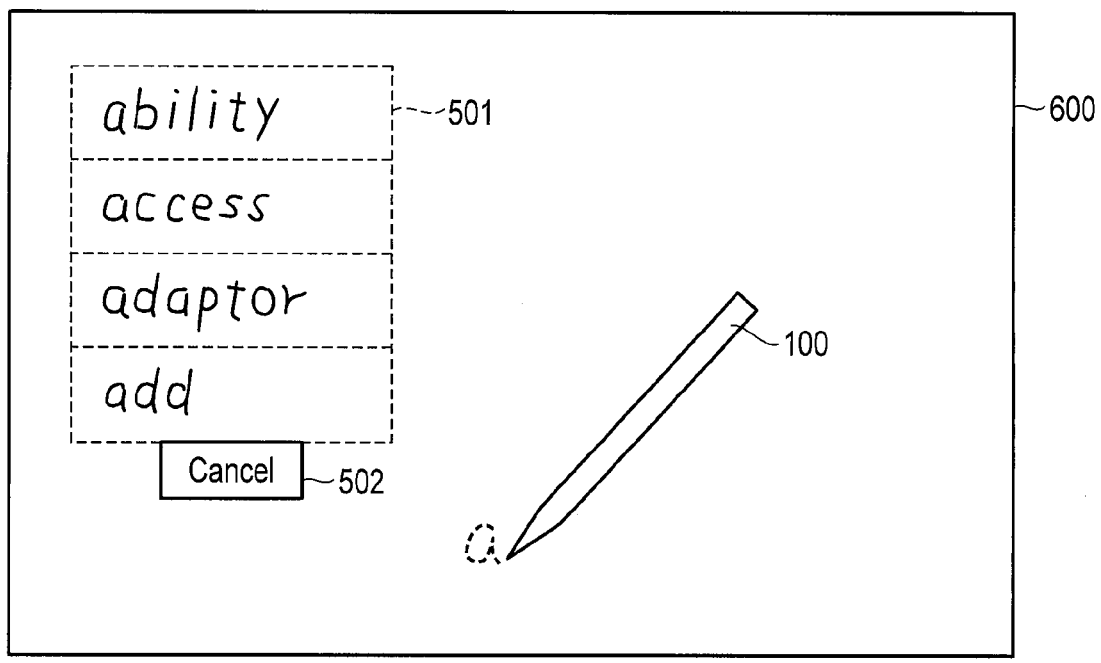
FIG. 6 illustrates an exemplary structure of a candidate stroke database.
FIG. 7 is an exemplary drawing for explaining a candidate stroke displayed by the electronic device of FIG. 1.

FIG. 6 illustrates an example of a structure of the candidate stroke database 402B. The candidate stroke database 402B is generated, for example, by analyzing stroke data corresponding to an input stroke and the handwritten note database 402A. The candidate stroke database 402B is generated, for example, for each user.

The candidate stroke database 402B includes a plurality of entries corresponding to a plurality of handwritten character strings. Each entry includes, for example, a character string, an amount of characteristics, and stroke data. In an entry corresponding to a certain handwritten character string, the "character string" indicates a text (character code string) corresponding to the handwritten character string. The "amount of characteristics" indicates an amount of characteristics corresponding to one or more strokes constituting the handwritten character string. The "stroke data" indicates stroke data (time-series data) corresponding to one or more strokes constituting the handwritten character string.

As the "character string", for example, a text (character code string) obtained by subjecting character recognition processing to stroke data shown in the "stroke data" is set. As the "amount of characteristics", for example, an amount of characteristics based on a stroke shape or a handwritten direction of a stroke calculated by stroke data shown in the "stroke data" is set.

FIG. 7 illustrates an example of a candidate stroke corresponding to an input stroke.

Here, a case where a stroke 611 corresponding to a handwritten letter "a" is input by a handwriting input operation on an editing screen 600 is described. The editing screen 600 is a screen for creating and editing a handwritten document (handwritten page).

When the stroke 611 is input by handwriting, the handwriting assist processor 308 obtains several groups of strokes (candidate strokes) corresponding to the input stroke 611 (handwritten letter "a" in here) from the candidate stroke database 402B. The handwriting assist processor 308 then displays the groups of strokes in a candidate stroke list 501 on the editing screen 600.

The input stroke 611 is treated as an "unconfirmed stroke (tentative stroke)". The "unconfirmed stroke" represents a stroke which has not been reflected in a handwritten page yet. The "unconfirmed stroke" is a subject of handwriting assist, and a candidate stroke predicted on the basis of this stroke is presented to the user. The input stroke 611 may be displayed in a color different from the color of the stylus currently selected, for example, in red such that the user can understand the input stroke 611 as an "unconfirmed stroke (tentative stroke)". In FIG. 7, the stroke is shown in red dashed lines.

In FIG. 7, a case is described where four groups of strokes are shown on the candidate stroke list 501 as candidate strokes. Here, these four stroke groups include a handwritten character string "ability", a handwritten character string "access", a handwritten character string "adaptor", and a handwritten character string "add".

As described above, several groups of strokes (handwritten character strings) with the first handwritten letter "a" are presented to the user. These groups of strokes are groups of strokes (handwritten character strings) which the user input by handwriting in the past.

Further, the handwriting assist processor 308 may display a "cancel" button 502 in proximity to the candidate stroke list 501. The "cancel" button 502 functions as a confirmation button to make an input stroke (tentative stroke) a "confirmed stroke". The "confirmed stroke" represents a stroke reflected in a handwritten page. The "confirmed stroke" is excluded from the handwriting assist.

Figure 8:
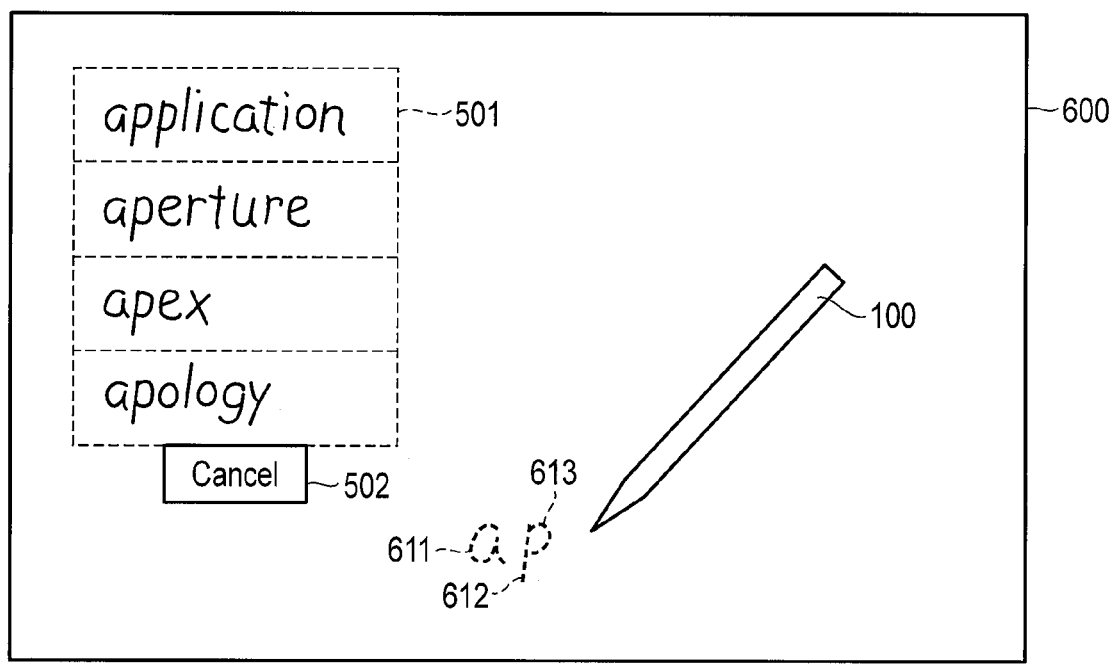
FIG. 8 is an exemplary drawing for explaining a candidate stroke newly displayed by the electronic device of FIG. 1 when another stroke is further input in the state of FIG. 7.

FIG. 8 illustrates another example of a candidate stroke corresponding to an input stroke.

Here, a case is described where, after the stroke 611 corresponding to the handwritten letter "a" is input, strokes 612 and 613 corresponding to a handwritten letter "p" are further input by a handwriting input operation on the editing screen 600. In this case, the contents of the candidate stroke list 501 are renewed.

That is, the handwriting assist processor 308 obtains several groups of strokes (candidate strokes) corresponding to the input strokes 611, 612 and 613 (handwritten character strings "ap") from the candidate stroke database 402B. Subsequently, the handwriting assist processor 308 displays these stroke groups on the candidate stroke list 501 on the editing screen 600.

In FIG. 8, a case where four groups of handwritten strokes, namely, a handwritten character string "application", a handwritten character string "aperture", a handwritten character string "apex" and a handwritten character string "apology" are shown on the candidate stroke list 501 as candidate strokes is described.

As described above, several handwritten character strings beginning with "ap" are presented to the user.

When a certain candidate stroke on the candidate stroke list 501 is selected by the user, the handwriting assist processor 308 displays a group of strokes (second stroke group) corresponding to the selected candidate stroke on the editing screen 600. In other words, the handwriting assist processor 308 complements the input handwritten stroke with the stroke group corresponding to the selected candidate stroke. In this way, the user can easily input an intended word by inputting a part of the intended word by handwriting.

Further, in a case of a character consisting of a plurality of strokes such as a Chinese character, the user only needs to input a part of these strokes by handwriting to input the character.

Still further, in a case of a cursive character string consisting of a single stroke, the user only needs to input the beginning of the stroke to input the cursive character string.

Figure 9:
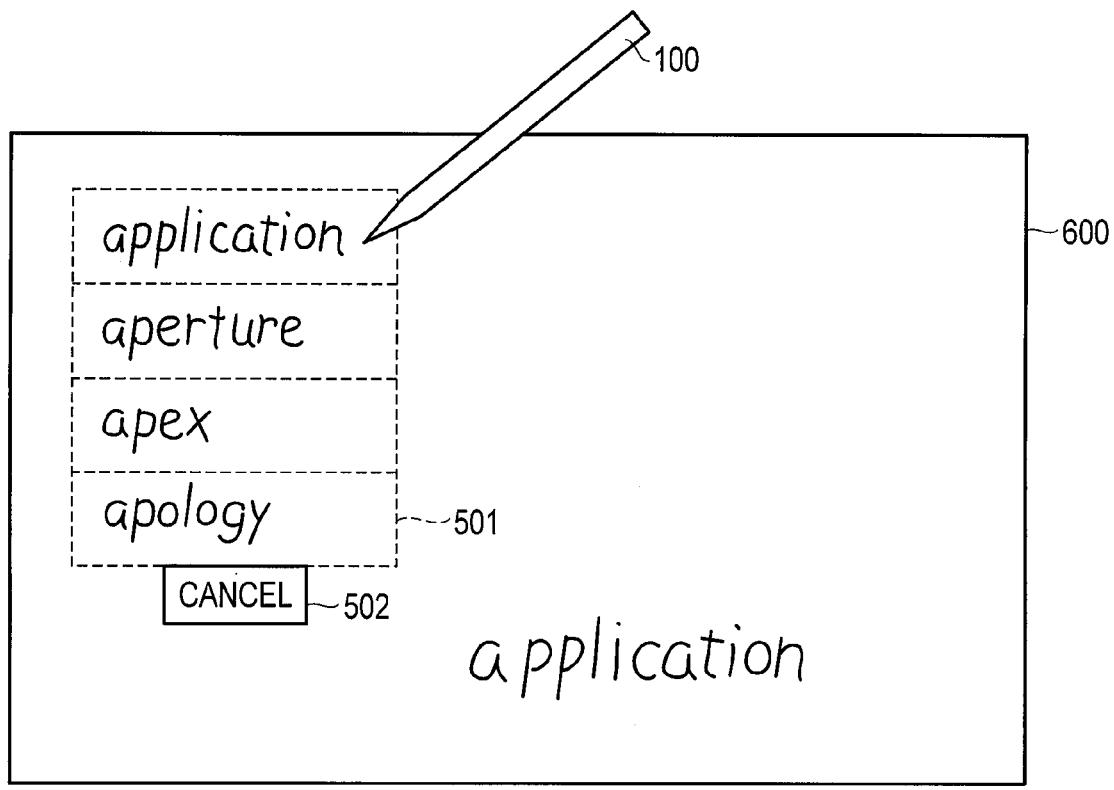
FIG. 9 is an exemplary drawing for explaining a handwritten stroke assist operation executed by the electronic device of FIG. 1.

FIG. 9 illustrates an operation to complement the input handwritten stroke.

Here, a case is described where the handwritten character string "application" on the candidate stroke list 501 is selected. When the handwritten character string "application" is tapped with the stylus 100 or a finger, the handwriting assist processor 308 cooperates with the display processor (stylus locus display processor 301 or handwritten document display processor 306) to execute processing for displaying the selected handwritten character string "application" on the editing screen 600. In this case, the input stroke (strokes 611, 612 and 613 of FIG. 8) is complemented with the selected handwritten character string "application". In other words, the display processor displays the selected handwritten character string "application" on the editing screen 600 instead of the input strokes (strokes 611, 612 and 613 of FIG. 8).

Then, the selected handwritten character string "application" becomes a confirmed stroke and reflected in a handwritten page currently being edited. That is, a group of items of stroke data of "application" obtained from the candidate stroke database 402B is added to the handwritten page. Note that, when the handwritten character string "application" is a group of strokes written in cursive, one item of stroke data corresponding to the handwritten character string "application" is added to the handwritten page.

In this way, in the handwriting assist processing, several handwritten character strings corresponding to a stroke (tentative stroke) input by handwriting are presented as candidate strokes to the user. Then, a certain candidate stroke (handwritten character string) selected is replaced with the tentative stroke and displayed on the editing screen 600.

However, each candidate stroke is a group of strokes (handwritten character string) input by handwriting in the past, and therefore the size and character gap of each candidate stroke may be different from those which the user intends to write. Consequently, if a selected candidate stroke is directly displayed on the editing screen 600, there is a possibility of inputting a candidate stroke (handwritten character string) having such a size or a character gap as to seem incongruous.

It can be considered to adopt a method of changing (resizing) the size of the selected candidate stroke (handwritten character string) based on the size of the tentative stroke. However, the tentative stroke is replaced with the selected candidate stroke (handwritten character string). Therefore, when the handwriting assist processing is executed, a handwritten character string followed by the selected candidate stroke is not the tentative stroke but a handwritten character string which have already been input before the tentative stroke. Further, the size of the tentative stroke does not always conform to the size of the handwritten character string already input before the tentative stroke, for example, the size of a handwritten character string immediately before the tentative stroke. Consequently, it is difficult to make the size of the selected candidate stroke appropriate by the method of changing the size of the selected candidate stroke (handwritten character string) based on the size of the tentative stroke.

Here, in the present embodiment, the handwriting assist processor 308 is configured to adjust the size of a selected candidate stroke (handwritten character string) not based on the size of a tentative stroke but based on the size of a handwritten character string input by handwriting before the input of the tentative stroke, for example, the size of a handwritten character string immediately before the tentative stroke. That is, the handwriting assist processor 308 cooperates with the above-mentioned display processor and executes processing for displaying, instead of the tentative stroke, the selected candidate stroke (handwritten character string) in the first size on the editing screen 600. The first size is set not based on the size of the tentative stroke but based on the size of the handwritten character string input by handwriting before the input of the tentative stroke.

A handwritten character string immediately before a tentative stroke may be in the line same as the line in which the tentative stroke is input. Further, when a tentative stroke is at the head of a line, a handwritten character string already input in one line before the line in which the tentative stroke is input may be used as the handwritten character string immediately before a tentative stroke.

Figure 10:
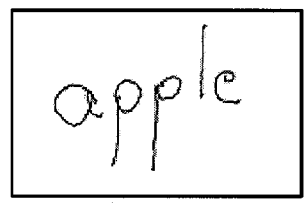
FIG. 10 illustrates an exemplary registered handwritten character string.
Figure 11:
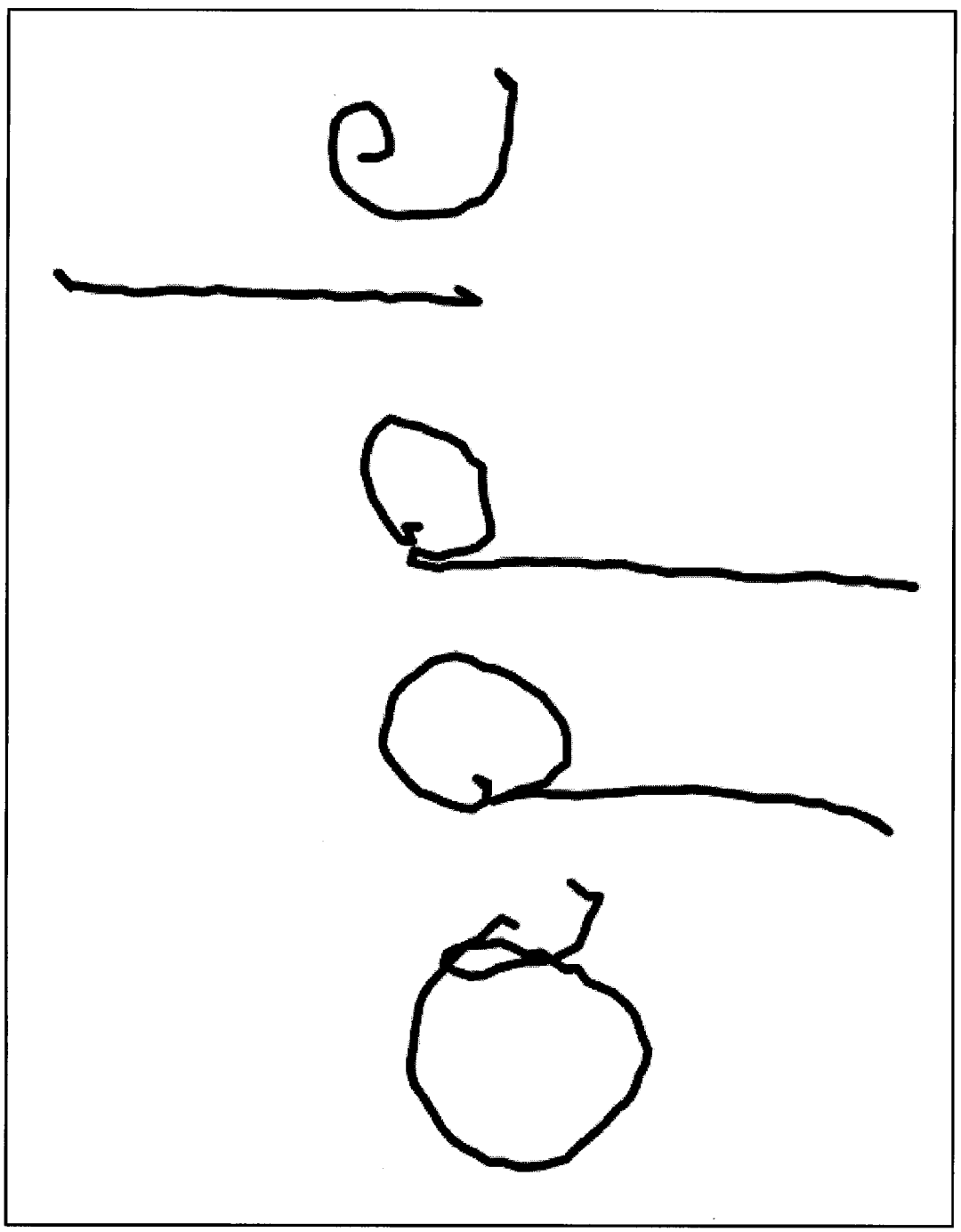
FIG. 11 illustrates a state of enlarged display of the handwritten character string of FIG. 10.

It should be noted that, in a case where a handwritten character string at the time of registration is in small size as shown in FIG. 10, when the registered handwritten character string is directly enlarged to be displayed, the noise becomes so noticeable as to distort the characters as shown in FIG. 11.

Figure 13:
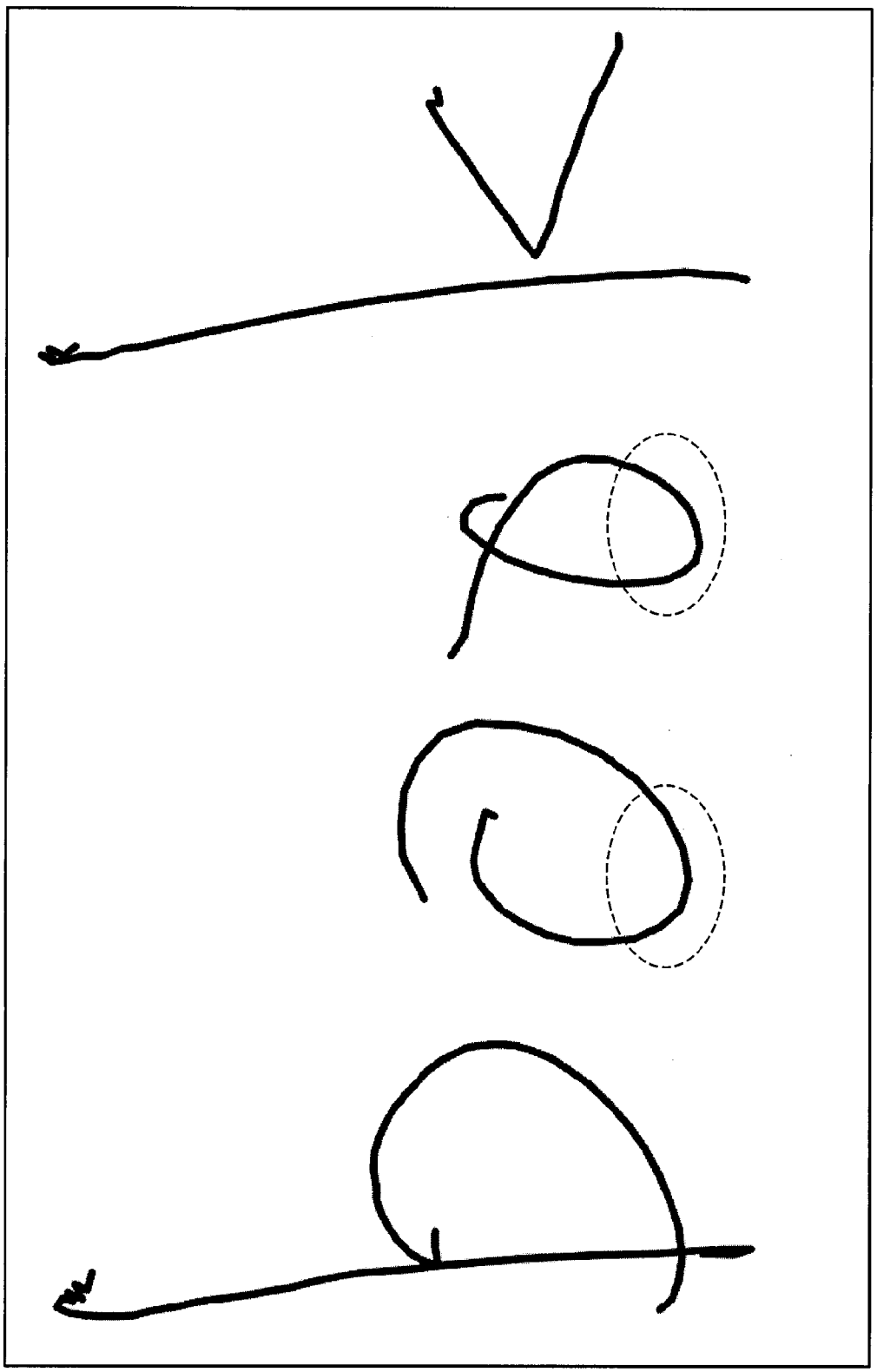
FIG. 13 illustrates a state of enlarged display of the handwritten character string of FIG. 12.

FIG. 13 is the enlarged display of the handwritten character string shown in FIG. 12. Since the number of the coordinates of the handwritten character string shown in FIG. 12 is small, the handwritten character string shown in FIG. 13 has sharp edges in portions circled by dashed lines.

Therefore, when a plurality of stroke data groups are registered for one handwritten character string, the handwriting assist processor 308 selects to display a stroke data group having a large graphic size (size of a handwritten character string corresponding to the stroke group) from the plurality of stroke data groups. Here, a graphic size is a size of a circumscribed rectangle of a handwritten character string.

Figure 14:
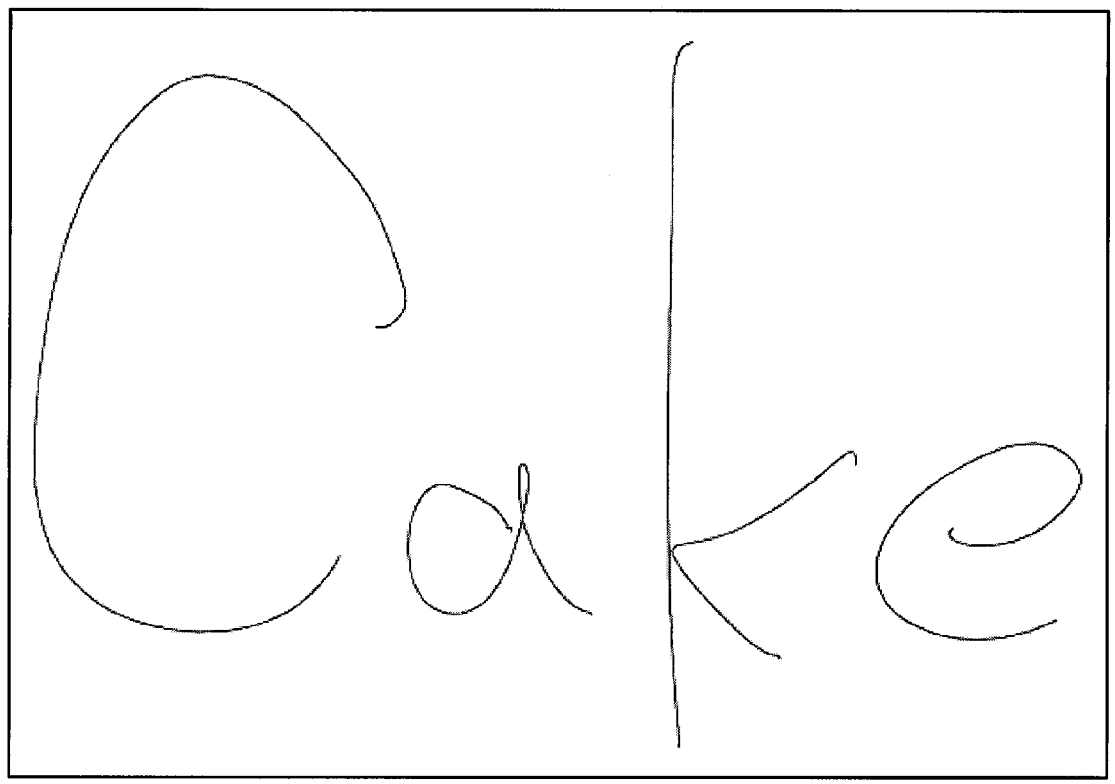
FIG. 14 illustrates an exemplary registered handwritten character string.
Figure 15:
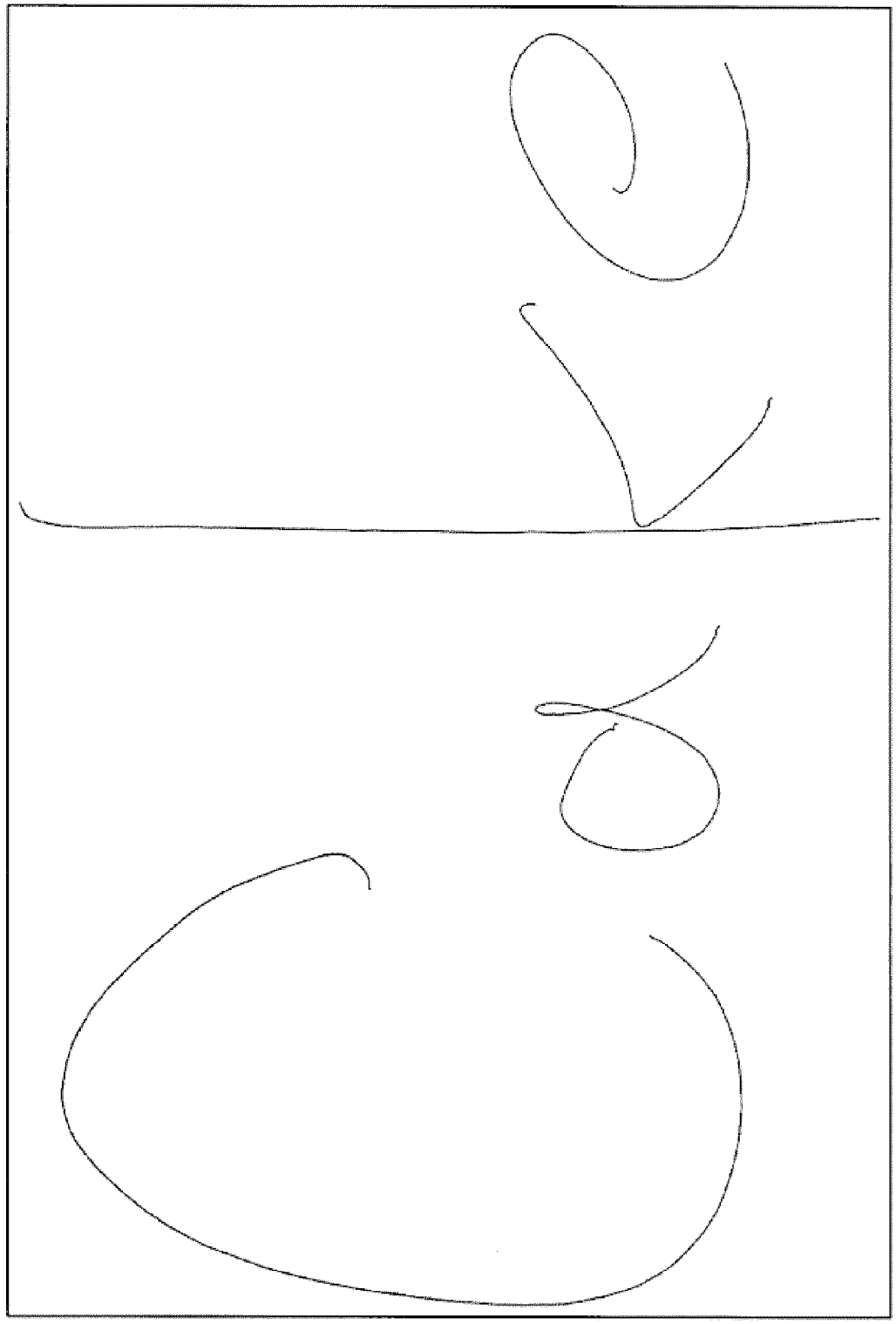
FIG. 15 illustrates a state of enlarged display of the handwritten character string of FIG. 14.

FIG. 15 is an enlarged display of the handwritten characters shown in FIG. 14. As shown in FIG. 15, the handwritten character string does not have noticeable noise or sharp edges.

Note that, when a graphic size is the same, the slower the writing speed becomes, the more closely coordinates will be arranged. Whether or not an angle as enlarged becomes noticeable as in the handwritten character string "book" shown in FIG. 13 also depends on the number of coordinates as well as the size of the character at the time of registration.

Figure 16:
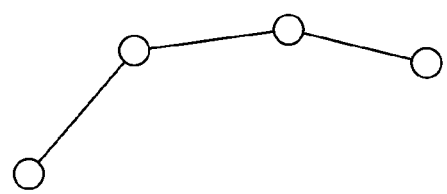
FIG. 16 illustrates an exemplary registered handwritten character string.
Figure 17:
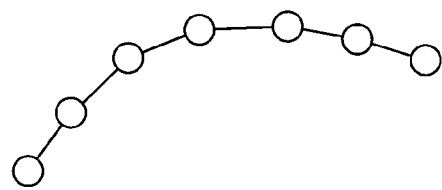
FIG. 17 illustrates an exemplary registered handwritten character string.

For example, the circumscribed rectangle of the locus of a handwritten stroke shown in FIG. 16 and the circumscribed rectangle of the locus of a handwritten stroke shown in FIG. 17 is substantially the same. However, the number of coordinates for displaying the handwritten stroke shown in FIG. 17 is larger than the number of coordinates for displaying the handwritten stroke shown in FIG. 16. When the stroke shown in FIG. 17 is enlarged, it is displayed smoothly. Therefore, when handwritten character strings of the same graphic size are registered in the handwritten note database 402A, a handwritten character having a larger number of coordinates is selected.

When each item of coordinate data includes timestamp data T corresponding to the point of time when a point corresponding to the coordinate is handwritten, based on the timestamp data, a handwritten character string in which the length of time required for input is the greatest may be selected.

Note that, when a plurality of stroke data groups are registered for one handwritten character string, the handwriting assist processor 308 may be configured to select any one of a handwritten character string having the largest graphic size, a handwritten character string having the largest number of coordinates contained in data for displaying the handwritten character string, and a handwritten character string having the greatest length of time required for input.

Still further, the handwriting assist processor 308 may preferentially select the second stroke group having a great value in any of the size of a character string corresponding to the stroke group, the number of coordinates for displaying a character string corresponding to the stroke group, and the length of time required for inputting a character string corresponding to the stroke group.

Still further, when there is a handwritten character string (third stroke group) in a plurality of stroke groups in the candidate stroke database 402B, subjected to registration processing by the user on a character registration screen, the handwriting assist processor 308 may select the handwritten character string subjected to the registration processing by the user on the character registration screen preferentially to a handwritten character string (second stroke group) obtained from a handwritten document. As a result, the handwriting assist processor 308 displays the handwritten character string subjected to the registration processing by the user on the character registration screen preferentially to the handwritten character string obtained form the handwritten document. By setting the graphic region of the registration screen relatively large, the input graphic size of a handwritten character string becomes large accordingly.

Note that, when there is a handwritten character string (third stroke group) subjected to the registration processing by the user on the character registration screen in a plurality of stroke groups in the candidate stroke database 402B, the handwriting assist processor 308 may select a handwritten character string (second stroke group) having a great value in any one of the size of a character string corresponding to the stroke group, the number of coordinates for displaying a handwritten character string corresponding to the stroke group, and the length of time required for inputting a character string corresponding to the stroke group, preferentially to the handwritten character string subjected to the registration processing, namely, the third stroke group. As a result, the handwriting assist processor 308 may display on the LCD 17A a handwritten character string (second stroke group) having a great value in any one of the size of a character string corresponding to the stroke group, the number of coordinates for displaying a character string corresponding to the stroke group, and the length of time required for inputting a character string corresponding to the stroke group, preferentially to the handwritten character string subjected to the registration processing, namely, the third stroke group.

Note that, when a plurality of handwritten character strings indicative of the same character string comprise the forth handwritten character string having a graphic size larger than that of a handwritten character string subjected to the registration processing by the user, the handwriting assist processor 308 may select the fourth handwritten character string instead of the handwritten character string subjected to the registration processing. Further, when the plurality of handwritten character strings indicative of the same character string include the fifth handwritten character string corresponding to data containing the number of coordinates larger than the number of coordinates contained in data for drawing a handwritten character string subjected to the registration processing by the user, the handwriting assist processor 308 may select the fifth handwritten character string instead of the handwritten character string subjected to the registration processing. Still further, the plurality of handwritten character strings indicative of the same character string include the sixth handwritten character string in which the length of time required for input is longer than that of a handwritten character string subjected to the registration processing by the user, the handwriting assist processor 308 may select the sixth handwritten character string instead of the handwritten character string subjected to the registration processing.

Figure 18:
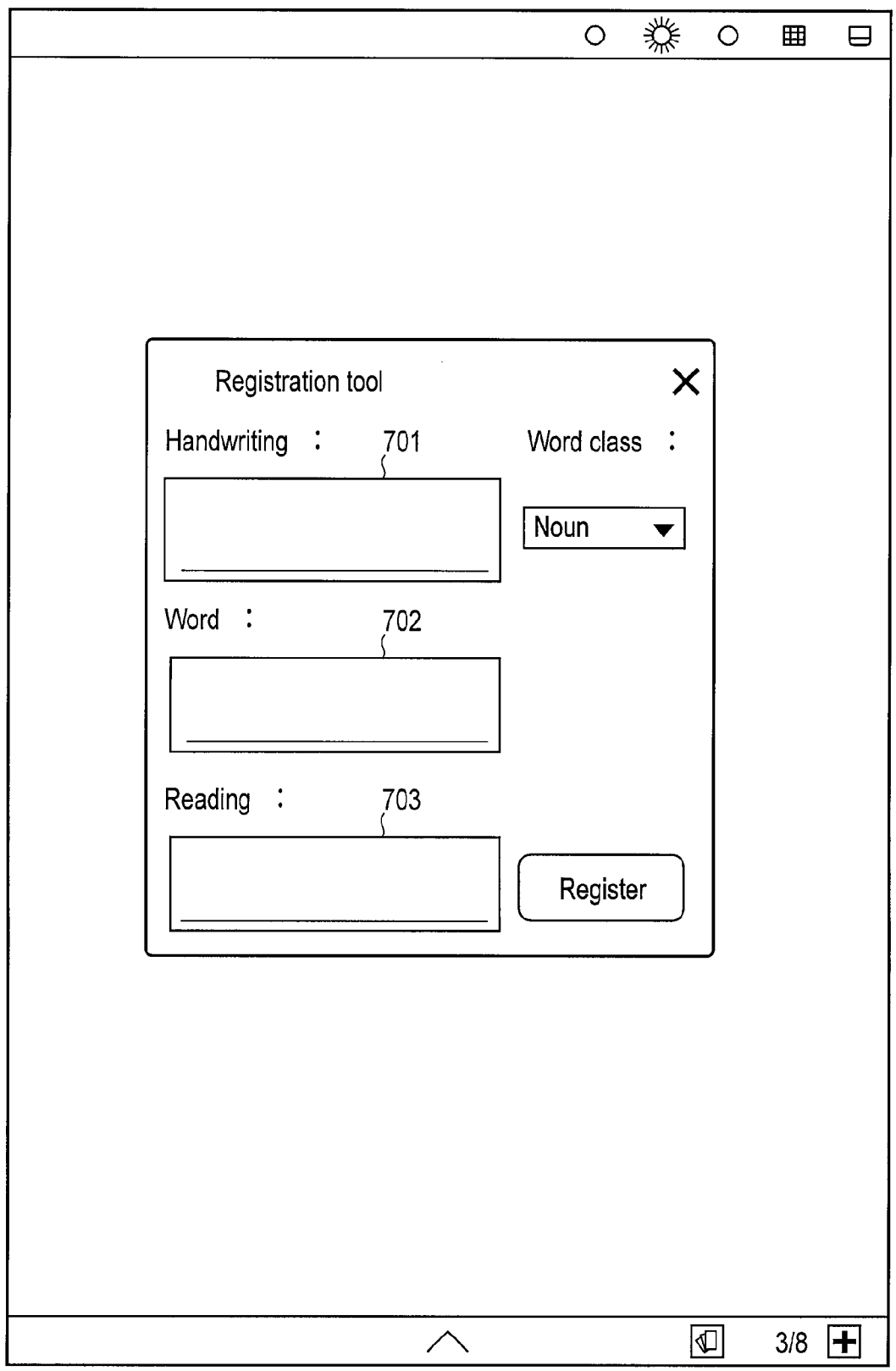
FIG. 18 illustrates an exemplary registration screen for the user to register a handwritten character string.

FIG. 18 illustrates an example of a registration screen for the user to register a handwritten character.

A column 701 for inputting a handwritten character string is larger than a column 702 for inputting a word and a column 703 for inputting a reading so that a handwritten character string is input on a large scale.

Figure 19:
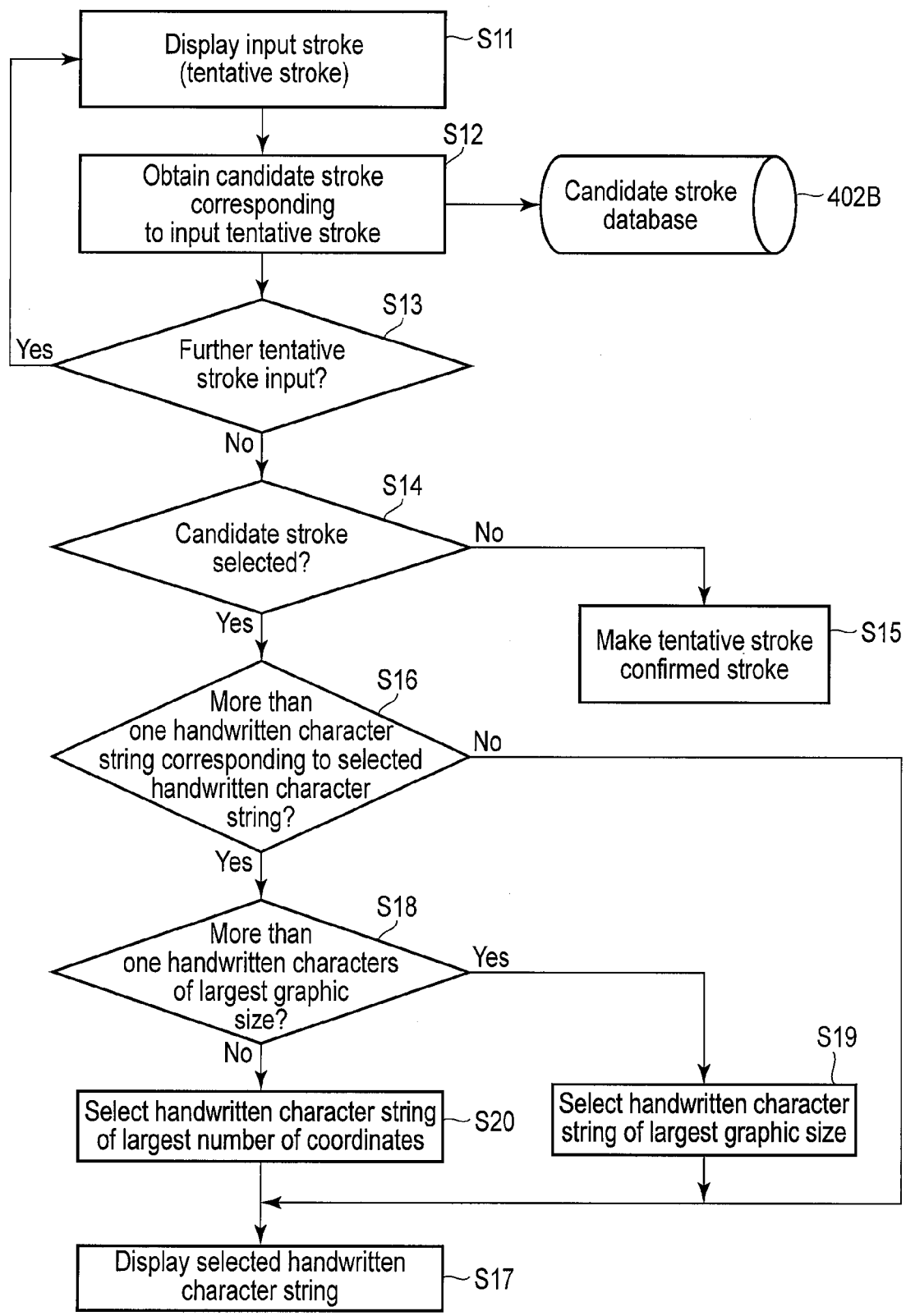
FIG. 19 is an exemplary flowchart showing a procedure for selecting a handwritten character string from a plurality of handwritten character strings all indicating the same character string.

FIG. 19 is a flowchart showing a procedure for selecting a handwritten character string from a plurality of handwritten character strings all indicating the same character string.

First, the handwriting assist processor 308 displays a tentative stroke which is input (step S11). A stroke corresponding to the input tentative stroke is obtained from the candidate stroke database 402B (step S12). The processing of the step S12 corresponds to processing for predicting a group of handwritten strokes (handwritten character string) which the user intends to input based on the input tentative stroke and the candidate stroke database 402B. Then, the handwriting assist processor 308 cooperates with the above display processor and displays a list of candidate strokes, namely the above-mentioned candidate stroke list 501 on a screen. In the candidate stroke list 501, several handwritten character strings are displayed. If a new tentative stroke is further input (Yes in step S13), the handwriting assist processor 308 obtains a handwritten character string (candidate stroke) corresponding to a combination of the tentative stroke input first and the new tentative stroke from the candidate stroke database 402B.

The handwritten assist processor 308 determines whether or not a certain handwritten character string (candidate stroke) is selected by the user (step S14). If no handwritten character string (candidate stroke) is selected by the user and the "cancel" button 502 is tapped by the user (No in step S14), the handwriting assist processor 308 makes the input tentative stroke a "confirmed stroke group" (step S15). In the step S15, the handwriting assist processor 308 deletes the candidate stroke list 501 from the screen.

If a certain handwritten character string (candidate stroke) is selected (Yes in step S16), the handwriting assist processor 308 determines whether or not there are a plurality of handwritten character strings corresponding to the selected handwritten character string. That is, the handwriting assist processor 308 determines whether or not there are a plurality of handwritten character strings indicative of the character string same as that of the selected handwritten character string. If it is determined that there is not more than one (No in step S16), the handwriting assist processor 308 cooperates with the above-mentioned display processor to display the selected handwritten character string instead of the tentative stroke (step S17). In the step S17, the input tentative stroke is replaced with a group of strokes of the selected character string. Further, the stroke group of the selected handwritten character string becomes confirmed strokes and reflected in a handwritten page which is currently being created and edited.

If it is determined that there is more than one (Yes in step S16), the handwriting assist processor 308 determines whether or not there are a plurality of handwritten character strings of the largest graphic size among a plurality of handwritten character strings all indicating the same character string (step S18). If there is not more than one (No in step S18), the handwriting assist processor 308 selects a handwritten character string having the largest graphic size from the plurality of handwritten character strings (step S19). The handwriting assist processor 308 cooperates with the above-mentioned display processor to display the handwritten character string selected in the step S18 on the editing screen instead of the tentative stroke (step S17).

If there is more than one (Yes in step S19), the handwriting assist processor 308 selects a handwritten character string having the largest number of coordinates from the plurality of handwritten character strings (step S20). The handwriting assist processor 308 cooperates with the above-mentioned display processor to display the handwritten character string selected in the step S19 on the editing screen instead of the tentative stroke (step S17).

A handwritten character string in which the magnification for displaying the handwritten character string is larger than the setting magnification may not be displayed in the candidate stroke list 501. When a handwritten character string in which the magnification for displaying the handwritten character string is larger than the setting magnification is displayed, noise becomes noticeable and sharp edges appear. However, by configuring not to display such handwritten character string on the candidate stroke list 501, a handwritten character string which is to have noticeable noise and sharp edges as enlarged will not be displayed.

As described above, in the present embodiment, when a certain stroke (first stroke) is input by handwriting, the second handwritten character string is selected from a plurality of the first handwritten character strings corresponding to the first stroke and indicative of the same character string, and the second handwritten character strings are displayed on the screen instead of the first stroke. From the plurality of the first handwritten character strings, any one of a handwritten character string having the largest graphic size, a handwritten character string having the largest number of coordinates in data for displaying the handwritten character string, and a handwritten character string having the greatest length of time required for input is selected as the second handwritten character string.

Note that, since various processing of the present embodiment can be realized by a computer program, the effect similar to that of the present embodiment can be easily realized simply by installing the computer program in a computer via a computer-readable storage medium storing the computer program to execute.

A CPU in a computer installing the computer program can function as a processor configured to execute the above-mentioned handwriting assist process. The CPU in the computer can function as a display processor configured to display strokes on a screen.

Further, in the present embodiment, a case where a tablet computer is used is described as an example, but the handwritten document processing function of the present embodiment is applicable to an ordinary desktop personal computer. In that case, it is only necessary to connect an input device for handwriting input such as a tablet computer to the desktop personal computer.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display capable of detecting a stroke made on the display and displaying the stroke;
a memory that stores different handwriting; and
a hardware processor configured to:
    detect a first stroke made on the display;
    display the first stroke on the display;
    search the handwriting in the memory for a first handwriting candidate and a second handwriting candidate in response to a detection of the first stroke, wherein both a part of the first handwriting candidate and a part of the second handwriting candidate match with the first stroke;
    select the second handwriting candidate, if a first character string of the first handwriting candidate and a second character string of the second handwriting candidate are the same and an input size of the second handwriting candidate is bigger than an input size of the first handwriting candidate; and
    display the second handwriting candidate on the display,
wherein the hardware processor is configured to further
    search the handwriting in the memory for a third handwriting candidate and a fourth handwriting candidate in response to a detection of the first stroke, wherein both a part of the third handwriting candidate and a part of the fourth handwriting candidate match with the first stroke;
    select the fourth handwriting candidate, if a third character string of the third handwriting candidate and a fourth character string of the fourth handwriting candidate are the same, an input size of the third handwriting candidate is equal to an input size of the fourth handwriting candidate, and a number of coordinates for displaying the fourth handwriting candidate is larger than a number of coordinates for displaying the third handwriting candidate; and
    display the fourth handwriting candidate on the display.

2. A method comprising:
detecting a first stroke made on a display;
display the first stroke on the display;
search handwriting in a memory for a first handwriting candidate and a second handwriting candidate in response to a detection of the first stroke, wherein the memory stores different handwriting and both a part of the first handwriting candidate and a part of the second handwriting candidate match with the first stroke;
selecting the second handwriting candidate, if a first character string of the first handwriting candidate and a second character string of the second handwriting candidate are the same and an input size of the second handwriting candidate is bigger than an input size of the first handwriting candidate or if a first character string of the first handwriting candidate and a second character string of the second handwriting candidate are the same and an input time of the second handwriting candidate is larger than an input time of the first handwriting candidate; and
displaying the second handwriting candidate on the display,
further comprising:
searching the handwriting in the memo for a third handwriting candidate and a fourth handwriting candidate in response to a detection of the first stroke, wherein both a part of the third handwriting candidate and a part of the fourth handwriting candidate match with the first stroke;
selecting the fourth handwriting candidate, if a third character string of the third handwriting candidate and a fourth character string of the fourth handwriting candidate are the same, an input size of the third handwriting candidate is equal to an input size of the fourth handwriting candidate, and a number of coordinates for displaying the fourth handwriting candidate is larger than a number of coordinates for displaying the third handwriting candidate or if a third character string of the third handwriting candidate and a fourth character string of the fourth handwriting candidate are the same, an input time of the third handwriting candidate is equal to an input time of the fourth handwriting candidate, and a number of coordinates for displaying the fourth handwriting candidate is larger than a number of coordinates for displaying the third handwriting candidate; and
display the fourth handwriting candidate on the display.

3. The device of claim 1, wherein the size of the second handwriting candidate displayed on the display is adjusted based on the input size of the first stroke.

4. An electronic device comprising:
a display capable of detecting a stroke made on the display and displaying the stroke;
a memory that stores different handwriting; and
a hardware processor configured to:
    detect a first stroke made on the display;
    display the first stroke on the display;
    search the handwriting in the memory for a first handwriting candidate and a second handwriting candidate in response to a detection of the first stroke, wherein both a part of the first handwriting candidate and a part of the second handwriting candidate match with the first stroke;
    select the second handwriting candidate, if a first character string of the first handwriting candidate and a second character string of the second handwriting candidate are the same and an input time of the second handwriting candidate is longer than an input time of the first handwriting candidate; and
    display the second handwriting candidate on the display,
wherein the hardware processor is configured to further
search the handwriting in the memory for a third handwriting candidate and a fourth handwriting candidate in response to a detection of the first stroke, wherein both a part of the third handwriting candidate and a part of the fourth handwriting candidate match with the first stroke;

select the fourth handwriting candidate, if a third character string of the third handwriting candidate and a fourth character string of the fourth handwriting candidate are the same, an input time of the third handwriting candidate is equal to an input time of the fourth handwriting candidate, and a number of coordinates for displaying the fourth handwriting candidate is larger than a number of coordinates for displaying the third handwriting candidate; and display the fourth handwriting candidate on the display.

5. The device of claim 4, wherein the size of the second handwriting candidate displayed on the display is adjusted based on the input size of the first stroke.

* * * * *